(12) United States Patent
Parthiban et al.

(10) Patent No.: US 9,946,553 B2
(45) Date of Patent: Apr. 17, 2018

(54) BMC FIRMWARE RECOVERY

(71) Applicant: AMERICAN MEGATRENDS, INC., Norcross, GA (US)

(72) Inventors: Baskar Parthiban, Johns Creek, GA (US); Muthuchamy Kumar, Chennai (IN); Satheesh Thomas, Dunwoody, GA (US)

(73) Assignee: AMERICA MEGATRENDS, INC., Norcross, GA (US)

( * ) Notice: Subject to any disclaimer, the term of this patent is extended or adjusted under 35 U.S.C. 154(b) by 108 days.

(21) Appl. No.: 15/146,638

(22) Filed: May 4, 2016

(65) Prior Publication Data

US 2017/0322816 A1 Nov. 9, 2017

(51) Int. Cl.
*G06F 9/44* (2018.01)

(52) U.S. Cl.
CPC .......... *G06F 9/4408* (2013.01); *G06F 9/4401* (2013.01); *G06F 9/4416* (2013.01)

(58) Field of Classification Search
CPC ..... G06F 9/4408; G06F 9/4416; G06F 9/4401
See application file for complete search history.

(56) References Cited

U.S. PATENT DOCUMENTS

| 6,651,188 B2 * | 11/2003 | Harding | G06F 11/1417 714/38.13 |
| 7,127,596 B2 * | 10/2006 | Rich | G06F 9/4406 711/162 |
| 9,542,195 B1 * | 1/2017 | Astarabadi | G06F 9/4411 |

* cited by examiner

*Primary Examiner* — Stefan Stoynov
(74) *Attorney, Agent, or Firm* — Locke Lord LLP; Time Tingkang Xia, Esq.

(57) ABSTRACT

In an aspect of the disclosure, a method, a computer-readable medium, and an apparatus are provided. The apparatus may be a management device. The management device initiates a first booting process of a program from a first image stored at a primary storage device of the management device. The management device re-initiates the first booting process from the first image when the first booting process is not successful and a number of re-initiation is less than a predetermined number. The management device locates a second image of the program from a secondary storage device when the first booting process is not successful and the number of re-initiation is greater than or equal to the predetermined number. The management device initiates a second booting process of the program from the second image subsequent to the locating the second image.

18 Claims, 5 Drawing Sheets

BMC FIRMWARE RECOVERY

BACKGROUND

Field

The present disclosure relates generally to computer management devices, and more particularly, to techniques of recovering firmware of a baseboard management controller (BMC) having a single serial peripheral interface (SPI) system.

Background

Considerable developments have been made in the arena of server management. An industry standard called Intelligent Platform Management Interface (IPMI), described in, e.g., "IPMI: Intelligent Platform Management Interface Specification, Second Generation," v. 2.0, Feb. 12, 2004, defines a protocol, requirements and guidelines for implementing a management solution for server-class computer systems. The features provided by the IPMI standard include power management, system event logging, environmental health monitoring using various sensors, watchdog timers, field replaceable unit information, in-band and out of band access to the management controller, SNMP traps, etc.

A component that is normally included in a server-class computer to implement the IPMI standard is known as a Baseboard Management Controller (BMC). A BMC is a specialized microcontroller embedded on the motherboard of the computer, which manages the interface between the system management software and the platform hardware. The BMC generally provides the "intelligence" in the IPMI architecture.

A BMC may require a firmware image to make them operational. "Firmware" is software that is stored in a read-only memory (ROM) (which may be reprogrammable), such as a ROM, PROM, EPROM, EEPROM, etc. Accordingly, there is a need to provide an improved firmware recovery mechanism.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a management device. The management device initiates a first booting process of a program from a first image stored at a primary storage device of the management device. The management device re-initiates the first booting process from the first image when the first booting process is not successful and a number of re-initiation is less than a predetermined number. The management device locates a second image of the program from a secondary storage device when the first booting process is not successful and the number of re-initiation is greater than or equal to the predetermined number. The management device initiates a second booting process of the program from the second image subsequent to the locating the second image, and replaces the first image on the primary storage device with the second image.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
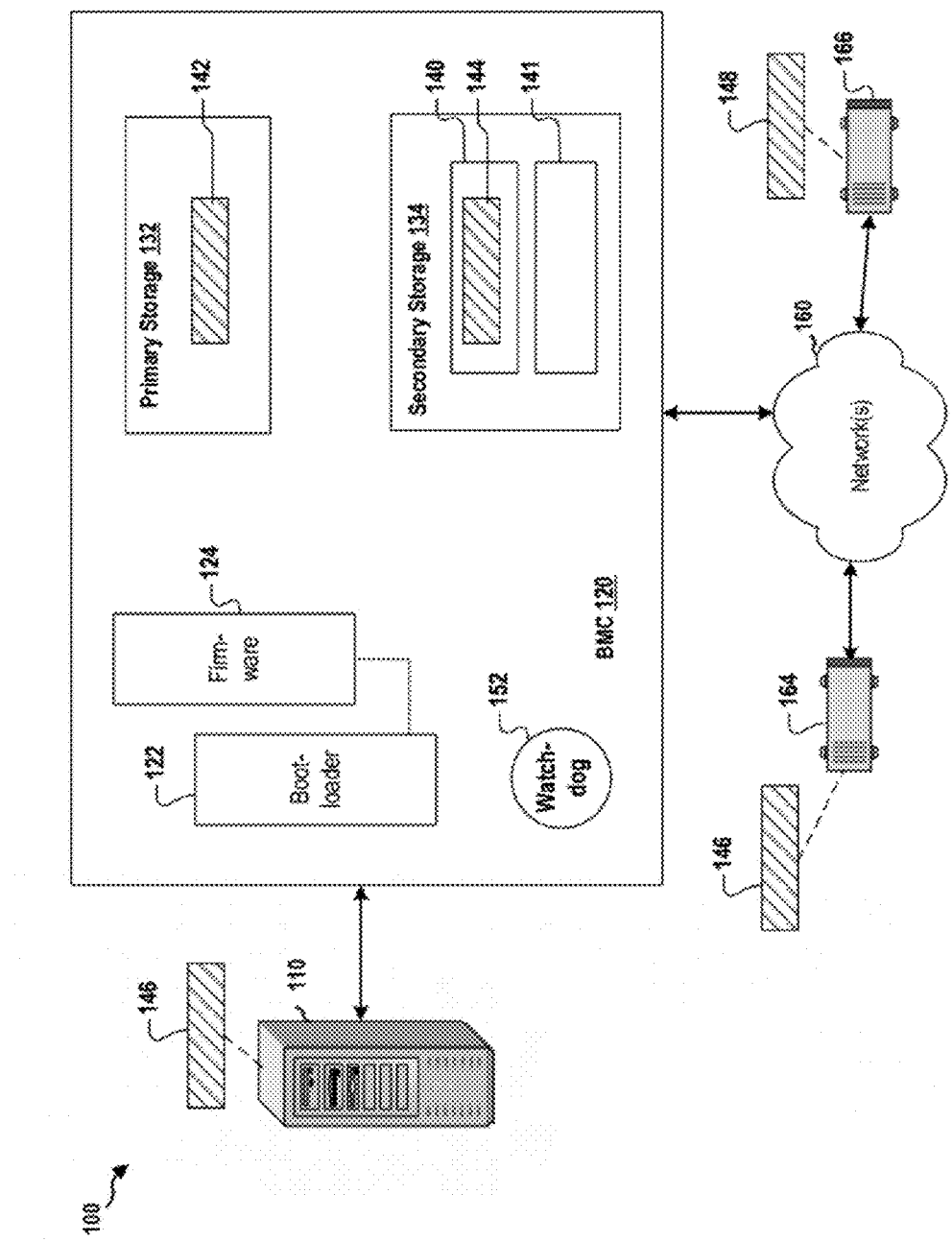
FIG. 1 is a diagram illustrating a BMC.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

A BMC operating system (OS) may be implemented as an embedded system, in particular an embedded LINUX system. An image of the OS may be stored on a serial peripheral interface (SPI) storage device. In certain configurations, a fail-safe system of the BMC uses two SPI storage devices or a large single SPI storage device that can store two OS images. In those configurations, when the image from one of the SPI storage devices fails to boot, the selector is changed to boot from the second SPI storage device. Often this is done from a boot loader (e.g., U-BOOT). The boot loader can detect a failure to boot the embedded OSes.

In certain configurations, a BMC may have an extra mass storage device such as a secure digital (SD) card. This mass storage device is for other features (e.g., storing application data). This mass storage device, however, can be utilized in a single SPI system. In particular, the mass storage device can be configured as a place for storing a backup disk image for the BMC OS. Further, this backup image can be updated to a replacement or updated image, after a successful boot following a firmware update. The boot loader can determine a failure to boot the embedded OSes. A hardware watchdog may be used to cause a reset of the BMC, when the existing image does not successfully boot. After a few retries, the boot loader can read the backup image from the extra mass storage device, flash that image into the SPI storage device, and then reset the BMC. As such, the BMC boots with the backup image.

FIG. 1 is a diagram 100 illustrating a BMC 120. The BMC 120 has a boot loader 122, a primary storage device 132, second storage device 134, and a watchdog 152. The BMC 120 may be in communication with a network device 164 and a network device 166 via a network 160. The BMC 120 may manage a host computer 110.

Further, the primary storage device 132 has a booting image 142 of a BMC firmware 124. In particular, the primary storage device 132 may be a SPI storage device dedicated for storing the booting image 142. The boot loader 122 may be configured to load the booting image 142 from the primary storage device 132. BMC firmware 124 may be an operating system based on LINUX. The BMC firmware 124 may implement a program stack supporting IPMI. The second storage device 134 stores a backup image 144 of the BMC firmware 124. The second storage device 134 may be a mass storage device that is generally used by the BMC firmware 124 to store operational data, IPMI data, application data, etc. For example, the second storage device 134 may be a SD card, a USB drive, etc. The data may be stored in a storage area 141 of the second storage device 134. In other words, the second storage device 134 is not a storage device dedicated only to store the backup image 144. Nonetheless, the second storage device 134 may be configured to include a particular folder 140 that is dedicated to store the backup image 144, and the backup image 144 is placed in the folder 140. The boot loader 122 may be configured with the information to locate the particular folder (e.g., a file path). Initially, the boot loader 122 reads the booting image 142 from the primary storage device 132 and boots the BMC firmware 124 using the booting image 142.

From time to time, the BMC firmware 124 may need to be updated (flashed). That is, the booting image 142 stored in the primary storage device 132 may need to be replaced by another version (e.g., a newer version) of the image. For example, the BMC firmware 124 or the boot loader 122 may receive a replacement image 146 from the host computer 110 or from a network device 164 through the network 160. Upon receiving the replacement image 146, the BMC firmware 124 or the boot loader 122 replaces the booting image 142 in the primary storage device 132 with the replacement image 146. As such, the replacement image 146 now serves as the booting image 142.

Subsequently, the boot loader 122 reads the replacement image 146 from the primary storage device 132 and boots the BMC firmware 124 using the replacement image 146. If the booting is successful, the BMC firmware 124 replaces the backup image 144 in the second storage device 134 with the replacement image 146, knowing that the replacement image 146 is a working, functional copy.

Prior to the boot loader 122 starts booting the BMC firmware 124 from the booting image 142 (or the replacement image 146 serves as the booting image 142) on the primary storage device 132, the watchdog 152 is initiated (e.g., by the boot loader 122). In the watchdog 152 may be a hardware component. The watchdog 152 may be configured to trigger a reset (e.g., a restart) of the BMC 120 after a configurable time period. Further, the boot loader 122 may increment a boot-failure counter that is used to record the number of times the booting process has been initiated.

When the BMC firmware 124 is successfully booted, the BMC firmware 124 may be configured to disable or interrupt the watchdog 152 before the configurable time period is reached. Consequently, the watchdog 152 is not able to reset the BMC 120. Further, the BMC firmware 124 or, after BMC reset, the boot loader 122 may reset the boot-failure counter to a default value (e.g., 0). The booted BMC firmware 124 continues to run. For example, the BMC firmware 124 may perform IPMI functions as well as read data from and write data to the second storage device 134 in connection with performing the IPMI functions.

On the other hand, the booting process from the booting image 142 may not be successful. For example, the booting process may be hung or may encounter a fatal error. Therefore, the booting process does not proceed to the point at which the BMC firmware 124 may disable or interrupt the watchdog 152. As the watchdog 152 continues to run, the watchdog 152 resets the BMC 120 at the end of the configurable time period described supra.

After a reset, the BMC 120 starts the boot loader 122 again. The boot loader 122 initially checks the boot-failure counter to determine if the boot-failure counter reaches a pre-configured number (e.g., 5). If not, the boot loader 122 reads the booting image 142 from the primary storage device 132 and boots the BMC firmware 124 from the primary storage device 132 again as described supra. If the boot-failure counter has reached the pre-configured number, the boot loader 122 then locates the backup image 144 stored on the second storage device 134 (e.g., in the folder 140). The boot loader 122 copies the backup image 144 from the second storage device 134 to the primary storage device 132. That is, the boot loader 122 may replace the booting image 142 with the backup image 144.

Subsequently, the boot loader 122 reads the backup image 144 from the primary storage device 132 and boots the BMC firmware 124 from the backup image 144. In certain configurations, the boot loader 122 may keep a record that the BMC firmware 124 is now being booted from the backup image 144 and may also reset the boot-failure counter to the default value.

Similar to what was described supra, the boot loader 122 may also initiate the watchdog 152 prior to initiating the booting process from the backup image 144). Further, the boot loader 122 may also increment the boot-failure counter prior to initiating the booting process. When the BMC firmware 124 is booted from the backup image 144 successfully, the BMC firmware 124 may be configured to disable or interrupt the watchdog 152. Consequently, the watchdog 152 does not reset the BMC 120. Further, the BMC firmware 124 or, after BMC reset, the boot loader 122 may reset the boot-failure counter to the default value (e.g., 0). When the booting process from the backup image 144 is not successful, the watchdog 152 continues to run (as it is not disabled or interrupted), and resets the BMC 120 at the end of the configurable time period as described supra.

After the reset, the BMC 120 starts the boot loader 122 again. The boot loader 122 initially checks the boot-failure counter to determine if the boot-failure counter reaches a second pre-configured number (e.g., 3), which is configured to set a limit of times the boot loader 122 may boot from the backup image 144. If not, the boot loader 122 reads the backup image 144 from the primary storage device 132 and tries to boot the BMC firmware 124 from the primary storage device 132 again as described supra. If the boot-failure counter has reached the second pre-configured number, the boot loader 122 then may try to locate a recovery backup image 148. For example, the network device 166 may be a trivial file transfer protocol (TFTP) server. The boot loader 122 may be configured with the network address of the TFTP server and the file name of the recovery backup image 148. Accordingly, the boot loader 122 may try to download the recovery backup image 148 from the TFTP server. The boot loader 122 may replace the image 142 on the primary storage device 132 with the recovery backup image 148.

Subsequently, the boot loader 122 may try to boot the BMC firmware 124 from the recovery backup image 148 on the primary storage device 132. If after several tries (e.g., employing the techniques described supra), the booting process is still not successful. The boot loader 122 may generate an error message and exit. If the booting process is successful, the boot loader 122 may copy the recovery backup image 148 to the second storage device 134. Thus, the recovery backup image 148 now serves as the backup image 144.

Figure 2:
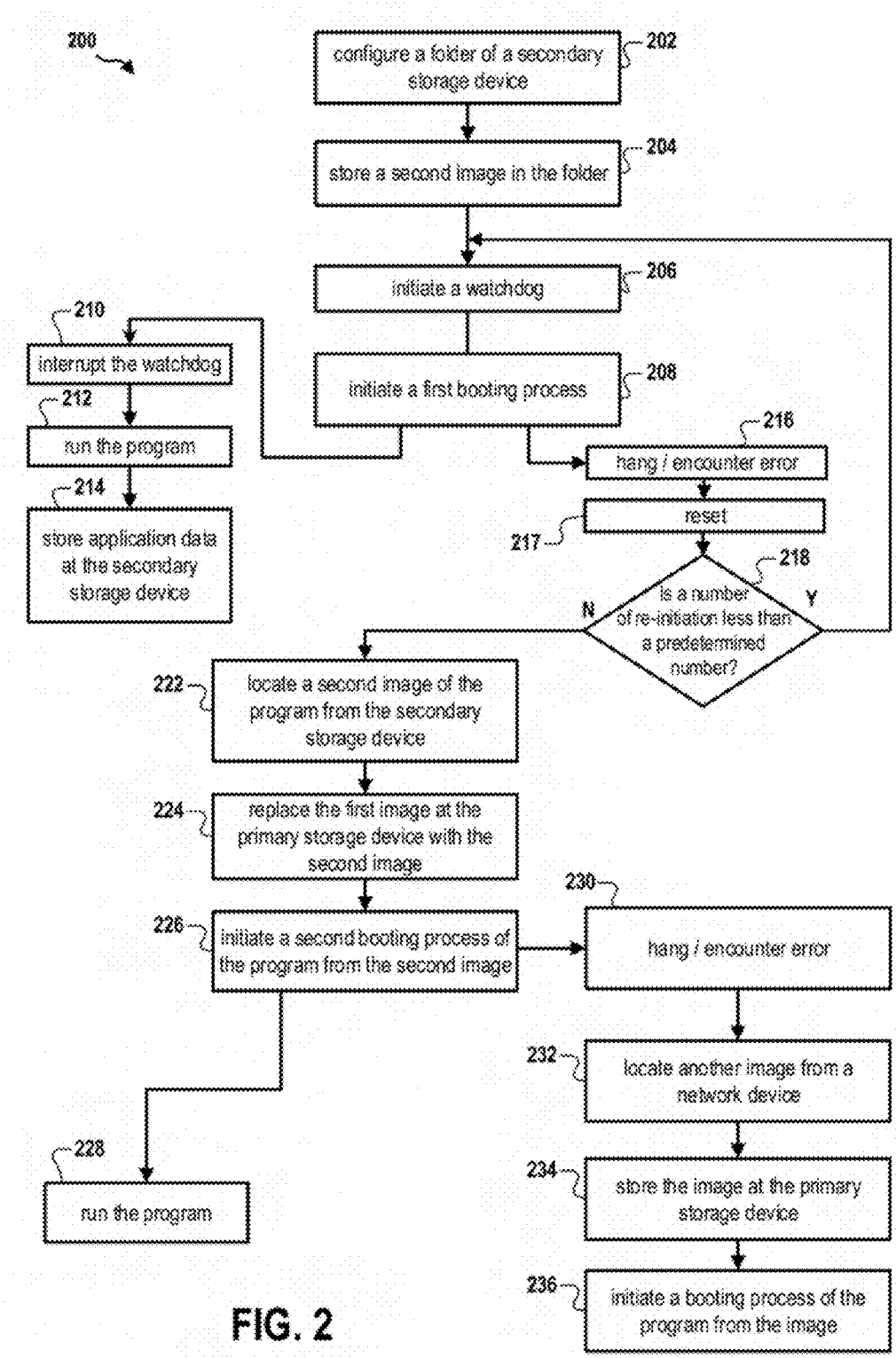
FIG. 2 is a flow chart of a method (process) for recovering a disk image of a program.

FIG. 2 is a flow chart 200 of a method (process) for recovering a disk image of a program. The method may be performed by a management device (e.g., the BMC 120 and the apparatus 302/302'). In certain configurations, at operation 202, the management device may configure a folder of a secondary storage device (e.g., the second storage device 134). At operation 204, the management device may store a second image (e.g., the backup image 144) of a program (e.g., a BMC OS) in the folder. At operation 206, the management device may initiate a watchdog (e.g., the watchdog 152). The watchdog is configured to wait, unless interrupted, a predetermined time period subsequent to the initiating the first booting process and then trigger a reset of the management device. At operation 208, the management device initiates a first booting process of the program from a first image (e.g., the booting image 142) stored at a primary storage device (e.g., the primary storage device 132) of the management device.

When the first booting process is successful, the management device enters operation 210, at which the management device interrupts the watchdog. At operation 212, the management device runs the program. At operation 214, the management device stores application data at the secondary storage device. In certain configurations, the primary storage device is a SPI storage device. The secondary storage device is not a SPI storage device.

On the other hand, the first booting process may not be successful. The first process is not successful when the watchdog is not interrupted during the predetermined time period. For example, at operation 216, the management device may hang or encounter an error. As such, at operation 217, the watchdog resets the management device. After reset, the management device, at operation 218, determines whether a number of re-initiation is less than a predetermined number. When the number of re-initiation is less than the predetermined number, the management device goes back to operation 206 and restarts the watchdog. At operation 208, the management device re-initiates the first booting process from the first image. Subsequently, the management device executes operations 216, 217, 218 as described supra.

When the number of re-initiation is not less than the predetermined number, the management device, at operation 222, locates the second image of the program from the secondary storage device. At operation 224, the management device replaces the second image at the secondary storage device. At operation 226, the management device initiates a second booting process of the program from the second image.

When the second booting process is successful, the management device enters operation 228, at which the management device runs the program. On the other hand, the second booting process may not be successful. For example, at operation 230, the management device may hang or encounter an error. At operation 232, the management device locates a fourth image (e.g., the recovery backup image 148) from a network device (e.g., the network device 166). At operation 234, the management device stores the fourth image at the primary storage device. At operation 236, the management device initiates a fourth booting process of the program from the fourth image.

In certain configurations, the management device may receive a third image (e.g., the replacement image 146) of the program. The management device may store the third image at the primary storage device. The management device may initiate a third booting process of the program from the third image at the primary storage device. In certain configurations, the management device may replace the second image at the second storage device with the third image from the primary storage device when the third booting process is successful.

Figure 3:
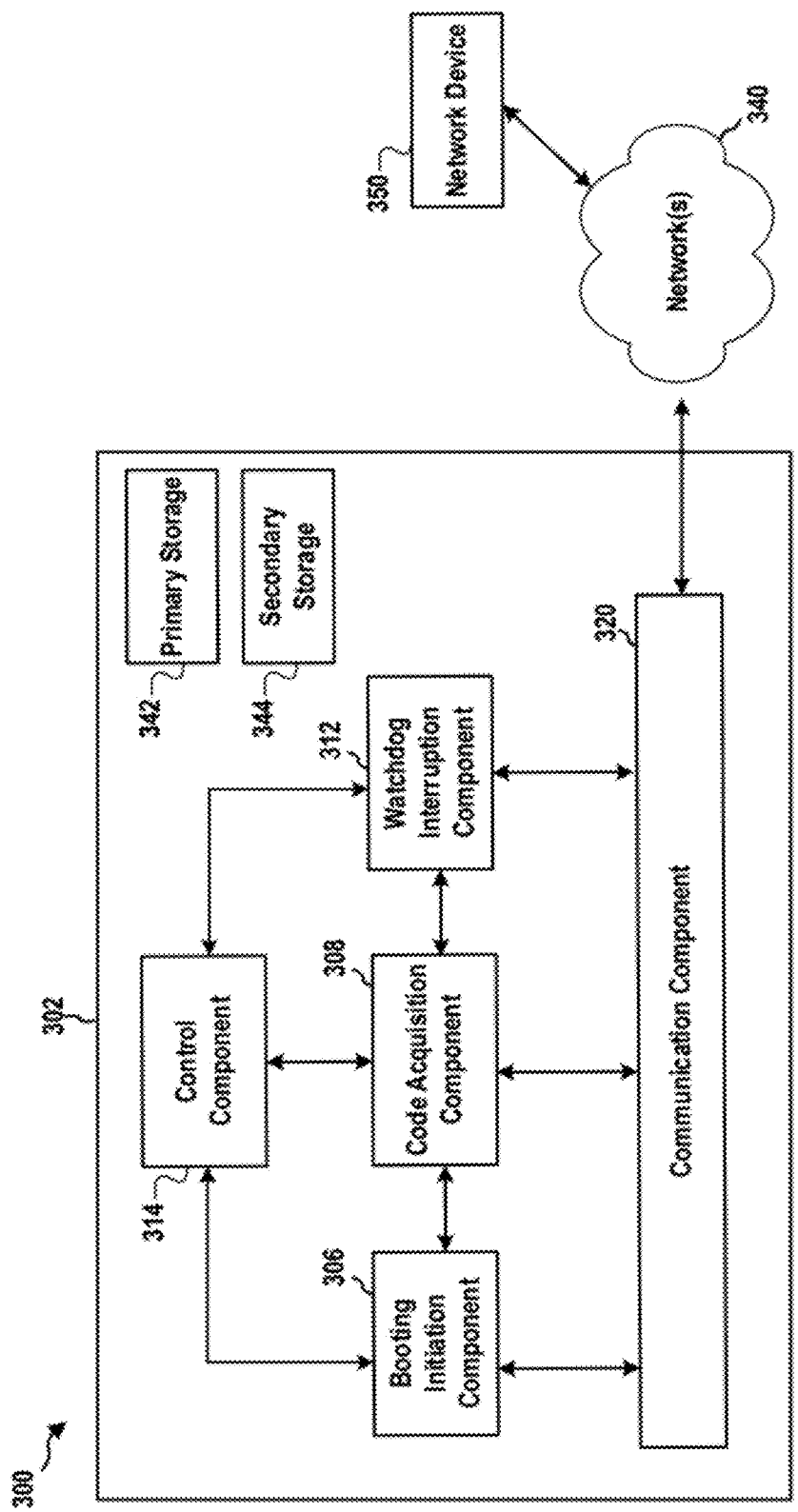
FIG. 3 is a conceptual data flow diagram illustrating the data flow between different means/components in an exemplary apparatus.

FIG. 3 is a conceptual data flow diagram 300 illustrating the data flow between different components/means in an exemplary apparatus 302. The apparatus 302 may be a management device (e.g., the BMC 120). The apparatus 302 includes, among other components, a booting initiation component 306, a code acquisition component 308, a watchdog interruption component 312, a control component 314, and a communication component 320. The apparatus 302 also includes a primary storage device 342 and a secondary storage device 344. The apparatus 302 may be in communication with, through one or more networks 340, a network device 350.

In certain configurations, the control component 314 may configure a folder of the secondary storage device 344. The control component 314 may store a second image in the folder. The booting initiation component 306 initiates a first booting process of a program from a first image stored at the primary storage device 342 of the apparatus 302. The control component 314 may initiate a watchdog. The watchdog is configured to wait, unless interrupted, a predetermined time period subsequent to the initiating the first booting process and then trigger a reset of the apparatus 302. The control component 314 determines whether the first booting process is successful. The first process is not successful when the watchdog is not interrupted during the predetermined time period.

When the first booting process is determined to be successful, the watchdog interruption component 312 interrupts the watchdog. The apparatus 302 runs the program. The program may store application data at the secondary storage device 344. In certain configurations, the primary storage device 342 is a SPI storage device. The secondary storage device 344 is not a SPI storage device.

When the first booting process is determined to be not successful, the control component 314 determines whether a number of re-initiation is less than a predetermined number. When the number of re-initiation is less than the predetermined number, the booting initiation component 306 re-initiates the first booting process from the first image.

When the number of re-initiation is not less than the predetermined number, the code acquisition component 308 locates a second image of the program from the secondary storage device 344. The code acquisition component 308 replaces the second image at the secondary storage device 344. The booting initiation component 306 initiates a second booting process of the program from the second image.

The control component 314 determines whether the second booting process is successful. When the second booting process is successful, the apparatus 302 runs the program booted from the second image. When the second booting process is not successful, the code acquisition component 308 locates a fourth image from the network device 350 through the communication component 320. The code acquisition component 308 stores the fourth image at the primary storage device 342. The booting initiation component 306 initiates a fourth booting process of the program from the fourth image.

In certain configurations, the code acquisition component 308 may receive a third image of the program. The code acquisition component 308 may store the third image at the primary storage device 342. The booting initiation component 306 may initiate a third booting process of the program from the third image at the primary storage device 342. In certain configurations, the code acquisition component 308 may replace the second image at the second storage device with the third image from the primary storage device 342 when the third booting process is successful.

The apparatus may include additional components that perform each of the blocks of the algorithm in the aforementioned flowcharts of FIG. 2. As such, each block in the aforementioned flowcharts of FIG. 2 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 4:
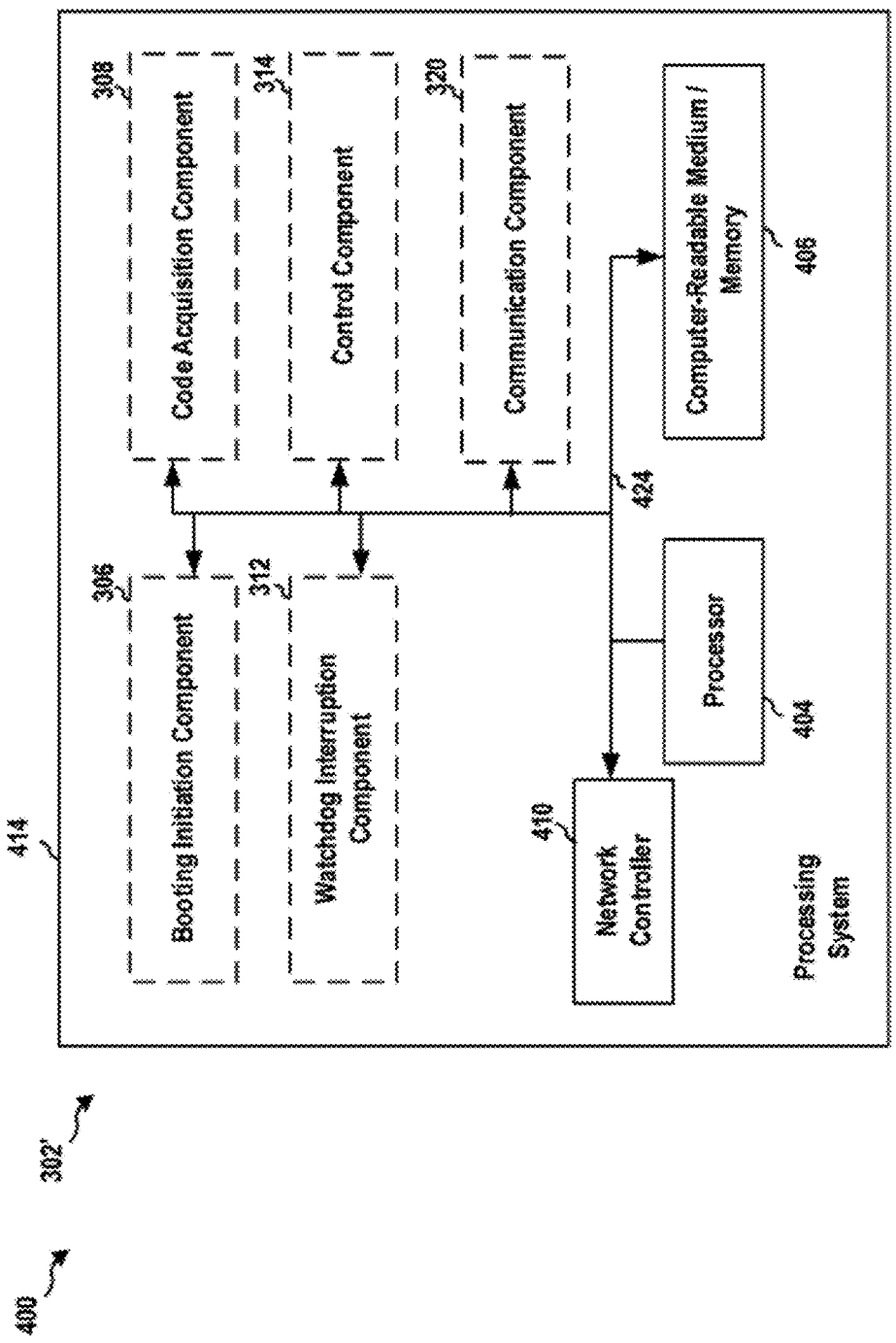
FIG. 4 is a diagram illustrating an example of a hardware implementation for an apparatus employing a processing system.

FIG. 4 is a diagram 400 illustrating an example of a hardware implementation for an apparatus 302' employing a processing system 414. The processing system 414 may be implemented with a bus architecture, represented generally by the bus 424. The bus 424 may include any number of interconnecting buses and bridges depending on the specific application of the processing system 414 and the overall design constraints. The bus 424 links together various circuits including one or more processors and/or hardware components, represented by the processor 404, the components 306, 308, 312, 314, 320, and the computer-readable medium/memory 406. In particular, the computer-readable medium/memory 406 may include the primary storage device 342 and the secondary storage device 344. The bus 424 may also link various other circuits such as timing sources, peripherals, voltage regulators, and power management circuits, which are well known in the art, and therefore, will not be described any further.

The processing system 414 may be coupled to a network controller 410. The network controller 410 provides a means for communicating with various other apparatus over a network. The network controller 410 receives a signal from the network, extracts information from the received signal, and provides the extracted information to the processing system 414, specifically the communication component 320. In addition, the network controller 410 receives information from the processing system 414, specifically the communication component 320, and based on the received information, generates a signal to be sent to the network. The processing system 414 includes a processor 404 coupled to a computer-readable medium/memory 406. The processor 404 is responsible for general processing, including the execution of software stored on the computer-readable medium/memory 406. The software, when executed by the processor 404, causes the processing system 414 to perform the various functions described supra for any particular apparatus. The computer-readable medium/memory 406 may also be used for storing data that is manipulated by the processor 404 when executing software. The processing system further includes at least one of the components 306, 308, 312, 314, 320. The components may be software components running in the processor 404, resident/stored in the computer readable medium/memory 406, one or more hardware components coupled to the processor 404, or some combination thereof.

The apparatus 302/302' may be configured to include means for performing each of the operations described supra referring to FIG. 2. The aforementioned means may be one or more of the aforementioned components of the apparatus 302 and/or the processing system 414 of the apparatus 302' configured to perform the functions recited by the aforementioned means.

Figure 5:
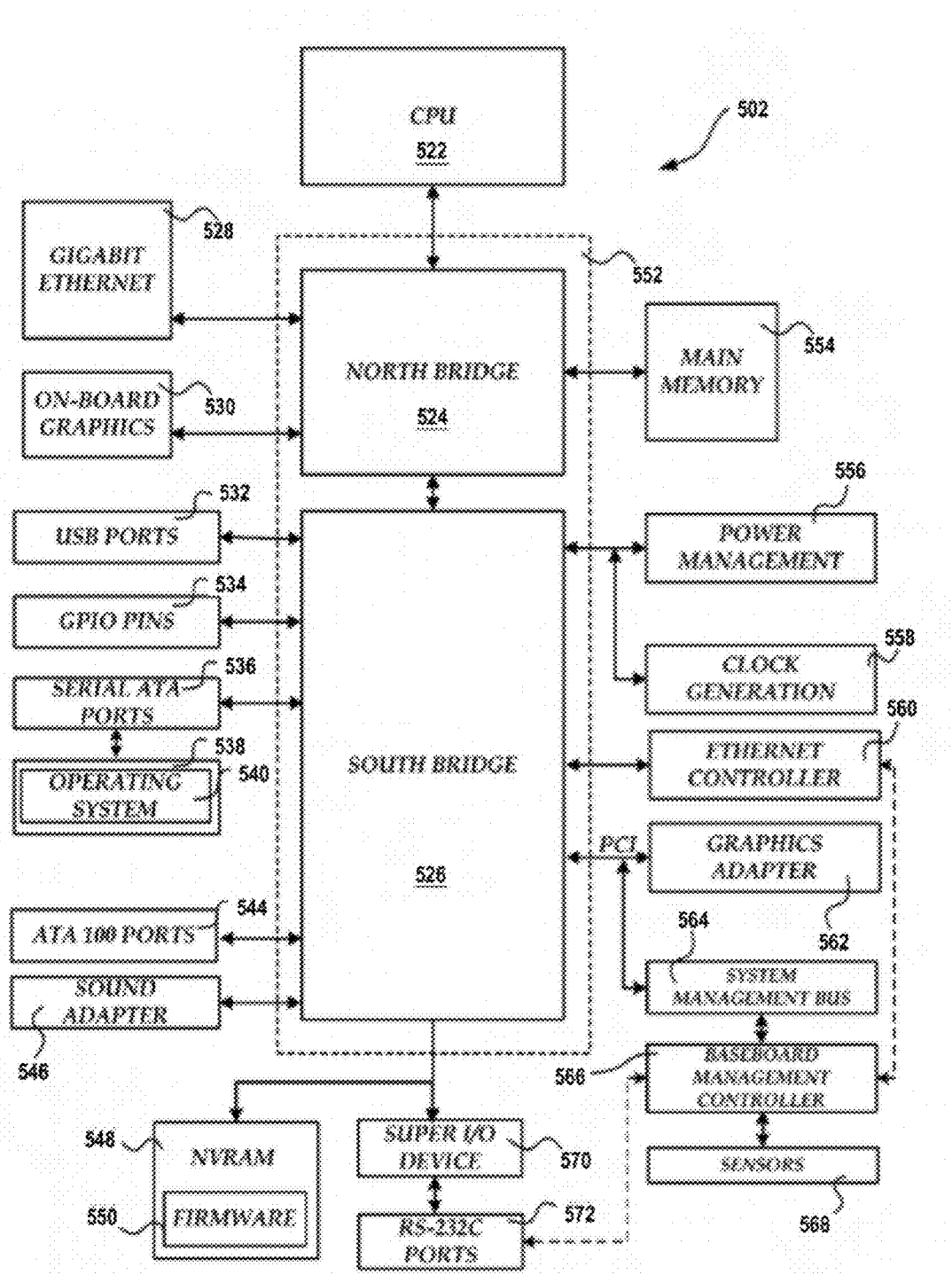
FIG. 5 shows a computer architecture for a computer.

FIG. 5 and the following discussion are intended to provide a brief, general description of one suitable computing environment in which aspects of the embodiments described herein may be implemented. In particular, FIG. 5 shows a computer architecture for a computer 502 that may be utilized to embody the host computer 110, as described supra. It should be appreciated that the computer architecture shown in FIG. 5 is merely illustrative and that other types of computers and computing devices may also be utilized to implement aspects of the embodiments presented herein.

While aspects presented herein include computer programs that execute in conjunction with the execution of an operating system, those skilled in the art will recognize that the embodiments may also be implemented in combination with other program modules and/or hardware devices. As described herein, computer programs include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

The computer 502 shown in FIG. 5 includes a baseboard, or "motherboard," which is a printed circuit board to which a multitude of components or devices may be connected by way of a system bus or other electrical communication path. In one illustrative embodiment, a CPU 522 operates in conjunction with a chipset 552. The CPU 522 is a standard central processor that performs arithmetic and logical operations necessary for the operation of the computer. The server computer 502 may include a multitude of CPUs 522.

The chipset 552 includes a north bridge 524 and a south bridge 526. The north bridge 524 provides an interface between the CPU 522 and the remainder of the computer 502. The north bridge 524 also provides an interface to a random access memory ("RAM") used as the main memory 554 in the computer 502 and, possibly, to an on-board graphics adapter 530. The north bridge 524 may also include functionality for providing networking functionality through a gigabit Ethernet adapter 528. The gigabit Ethernet adapter 528 is capable of connecting the computer 502 to another computer via a network. Connections which may be made by the network adapter 528 may include LAN or WAN connections. LAN and WAN networking environments are commonplace in offices, enterprise-wide computer networks, intranets, and the internet. The north bridge 524 is connected to the south bridge 526.

The south bridge 526 is responsible for controlling many of the input/output functions of the computer 502. In particular, the south bridge 526 may provide one or more USB ports 532, a sound adapter 546, an Ethernet controller 560, and one or more GPIO pins 534. The south bridge 526 may also provide a bus for interfacing peripheral card devices such as a graphics adapter 562. In one embodiment, the bus comprises a PCI bus. The south bridge 526 may also provide a system management bus 564 for use in managing the various components of the computer 502. Additional details regarding the operation of the system management bus 564 and its connected components are provided below.

The south bridge 526 is also operative to provide one or more interfaces for connecting mass storage devices to the computer 502. For instance, according to an embodiment, the south bridge 526 includes a serial advanced technology attachment ("SATA") adapter for providing one or more SATA ports 536 and an ATA 100 adapter for providing one or more ATA 100 ports 544. The SATA ports 536 and the ATA 100 ports 544 may be, in turn, connected to one or more mass storage devices such as the SATA disk drive 538 storing an operating system 540 and application programs.

As known to those skilled in the art, an operating system 540 comprises a set of programs that control operations of a computer and allocation of resources. An application program is software that runs on top of the operating system software, or other runtime environment, and uses computer resources to perform application specific tasks desired by the user. According to one embodiment of the invention, the operating system 540 comprises the LINUX operating system. According to another embodiment of the invention the operating system 540 comprises an operating system within the WINDOWS family of operating systems from MICROSOFT CORPORATION. According to another embodiment, the operating system 540 comprises the UNIX, LINUX, or SOLARIS operating system. It should be appreciated that other operating systems may also be utilized.

The mass storage devices connected to the south bridge 526, and their associated computer storage media, provide non-volatile storage for the computer 502. Although the description of computer storage media contained herein refers to a mass storage device, such as a hard disk or CD-ROM drive, it should be appreciated by those skilled in the art that computer storage media can be any available media that can be accessed by the computer 502.

By way of example, and not limitation, computer storage media may comprise volatile and non-volatile, removable and non-removable media implemented in any method or technology for storage of information such as computer-readable instructions, data structures, program modules or other data. Computer storage media also includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

According to embodiments, a low pin count ("LPC") interface may also be provided by the south bridge 526 for connecting a "Super I/O" device 570. The Super I/O device 570 is responsible for providing a number of input/output ports, including a keyboard port, a mouse port, a serial interface 572, a parallel port, and other types of input/output ports. The LPC interface may also connect a computer storage media such as a ROM or a flash memory such as a NVRAM 548 for storing the firmware 550 that includes program code containing the basic routines that help to start up the computer 502 and to transfer information between elements within the computer 502.

As described briefly above, the south bridge 526 may include a system management bus 564. The system management bus 564 may include a BMC 566. The BMC 566 may be the BMC 120. In general, the BMC 566 is a microcontroller that monitors operation of the computer system 502. In a more specific embodiment, the BMC 566 monitors health-related aspects associated with the computer system 502, such as, but not limited to, the temperature of one or more components of the computer system 502, speed of rotational components (e.g., spindle motor, CPU Fan, etc.) within the system, the voltage across or applied to one or more components within the system 502, and the available or used capacity of memory devices within the system 502. To accomplish these monitoring functions, the BMC 566 is communicatively connected to one or more components by way of the management bus 564. In an embodiment, these components include sensor devices 568 for measuring various operating and performance-related parameters within the computer system 502. The sensor devices 568 may be either hardware or software based components configured or programmed to measure or detect one or more of the various operating and performance-related parameters.

It should also be appreciated that the computer 502 may comprise other types of computing devices, including handheld computers, embedded computer systems, personal digital assistants, and other types of computing devices known to those skilled in the art. It is also contemplated that the computer 502 may not include all of the components shown in FIG. 5, may include other components that are not explicitly shown in FIG. 5, or may utilize an architecture completely different than that shown in FIG. 5.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of operating a baseboard management controller (BMC), comprising:

initiating a first booting process of a program from a first image stored at a primary storage device of the BMC;

re-initiating the first booting process from the first image when the first booting process is not successful and a number of re-initiation is less than a predetermined number;

locating a second image of the program from a secondary storage device when the first booting process is not successful and the number of re-initiation is greater than or equal to the predetermined number;

initiating a second booting process of the program from the second image subsequent to the locating the second image, wherein the primary storage device is a serial peripheral interface (SPI) storage device, wherein the secondary storage device is not an SPI storage device; and after the program is booted, the program storing application data at the secondary storage device.

2. The method of claim 1, the method further comprising:
initiating a watchdog, the watchdog being configured to wait, unless interrupted, a predetermined time period subsequent to the initiating the first booting process and then trigger a reset of the BMC, wherein the first process is not successful when the watchdog is not interrupted during the predetermined time period.

3. The method of claim 2, the method further comprising:
determining, after the reset and prior to the re-initiating or the locating, whether the number of re-initiation is less than the predetermined number when the first booting process is not successful.

4. The method of claim 2, the method further comprising:
interrupting the watchdog when the first booting process is successful.

5. The method of claim 1, the method further comprising:
configuring a folder of the secondary storage device; and
storing the second image in the folder.

6. The method of claim 5, wherein the second image is located in the folder, the method further comprising:
prior to initiating the second booting process, replacing the first image at the primary storage device with the second image after the second image is located, wherein the second booting process is initiated from the second image at the primary storage device.

7. The method of claim 1, the method further comprising:
receiving a third image of the program;
storing the third image at the primary storage device; and
initiating a third booting process of the program from the third image at the primary storage device.

8. The method of claim 7, the method further comprising:
replacing the second image at the secondary storage device with the first image when the third booting process is successful.

9. The method of claim 7, the method further comprising:
replacing the second image at the second storage device with the third image from the primary storage device when the third booting process is successful.

10. The method of claim 1, wherein when the initiating the second booting process is not successful, the method further comprises:
locating a third image from a network device;
storing the third image at the primary storage device; and
initiating a third booting process of the program from the fourth image.

11. An apparatus, the apparatus being a baseboard management controller (BMC), comprising:
a memory; and at least one processor coupled to the memory and configured to:
- initiate a first booting process of a program from a first image stored at a primary storage device of the BMC;
- re-initiate the first booting process from the first image when the first booting process is not successful and a number of re-initiation is less than a predetermined number;
- locate a second image of the program from a secondary storage device when the first booting process is not successful and the number of re-initiation is greater than or equal to the predetermined number; and
- initiate a second booting process of the program from the second image subsequent to the locating the second image, wherein the primary storage device is a serial peripheral interface (SPI) storage device, wherein the secondary storage device is not an SPI storage device; and
- after the program is booted, store application data, by the program, at the secondary storage device.

12. The apparatus of claim 11, wherein the at least one processor is further configured to:
- initiate a watchdog, the watchdog being configured to wait, unless interrupted, a predetermined time period subsequent to the initiating the first booting process and then trigger a reset of the BMC, wherein the first process is not successful when the watchdog is not interrupted during the predetermined time period.

13. The apparatus of claim 12, wherein the at least one processor is further configured to:
- determine, after the reset and prior to the re-initiating or the locating, whether the number of re-initiation is less than the predetermined number when the first booting process is not successful.

14. The apparatus of claim 12, wherein the at least one processor is further configured to:
- interrupt the watchdog when the first booting process is successful.

15. A non-transitory computer-readable medium storing computer executable code for operating a baseboard management controller (BMC), comprising code to:
- initiate a first booting process of a program from a first image stored at a primary storage device of the BMC;
- re-initiate the first booting process from the first image when the first booting process is not successful and a number of re-initiation is less than a predetermined number;
- locate a second image of the program from a secondary storage device when the first booting process is not successful and the number of re-initiation is greater than or equal to the predetermined number;
- initiate a second booting process of the program from the second image subsequent to the locating the second image, wherein the primary storage device is a serial peripheral interface (SPI) storage device, wherein the secondary storage device is not an SPI storage device; and
- after the program is booted, store application data, by the program, at the secondary storage device.

16. The non-transitory computer-readable medium of claim 15, wherein the code is further configured to:
- initiate a watchdog, the watchdog being configured to wait, unless interrupted, a predetermined time period subsequent to the initiating the first booting process and then trigger a reset of the BMC, wherein the first process is not successful when the watchdog is not interrupted during the predetermined time period.

17. The non-transitory computer-readable medium of claim 16, wherein the code is further configured to:
- determine, after the reset and prior to the re-initiating or the locating, whether the number of re-initiation is less than the predetermined number when the first booting process is not successful.

18. The non-transitory computer-readable medium of claim 16, wherein the code is further configured to:
- interrupt the watchdog when the first booting process is successful.

* * * * *